(12) United States Patent
Kanamori et al.

(10) Patent No.: US 8,866,388 B2
(45) Date of Patent: Oct. 21, 2014

(54) VEHICLE LAMP CONTROLLER

(75) Inventors: Akitaka Kanamori, Shizuoka (JP); Kentaro Tani, Shizuoka (JP); Naoki Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 135 days.

(21) Appl. No.: 13/534,646

(22) Filed: Jun. 27, 2012

(65) Prior Publication Data
US 2013/0002135 A1  Jan. 3, 2013

(30) Foreign Application Priority Data

Jun. 28, 2011 (JP) .................................. 2011-142401

(51) Int. Cl.
*B60Q 1/02* (2006.01)
*B60Q 1/14* (2006.01)
*B60Q 11/00* (2006.01)
*B60Q 1/08* (2006.01)

(52) U.S. Cl.
CPC .......... *B60Q 11/00* (2013.01); *B60Q 2300/146* (2013.01); *B60Q 1/143* (2013.01); *B60Q 1/08* (2013.01)
USPC ............................................. 315/82; 315/77

(58) Field of Classification Search
None
See application file for complete search history.

(56) References Cited

U.S. PATENT DOCUMENTS 5,426,589 A * 6/1995 Kitagawa et al. ............. 700/274
6,343,869 B1 * 2/2002 Kobayashi ....................... 362/37

FOREIGN PATENT DOCUMENTS

JP  2006-188122 A  7/2006

* cited by examiner

*Primary Examiner* — Douglas W Owens
*Assistant Examiner* — Dedei K Hammond
(74) *Attorney, Agent, or Firm* — Sughrue Mion, PLLC

(57) ABSTRACT

A vehicle lamp controller includes a lamp control unit that performs lamp control, in which light amount or light distribution of each of a plurality of lamps to be provided on a vehicle that runs on electric power from a battery, is controlled, according to a priority that is assigned to each of the plurality of lamps, wherein the priorities are determined based on degrees of necessity of the plurality of lamps in securing safety for the vehicle. The vehicle lamp controller may further include a remaining battery charge detecting device for detecting a remaining charge of a battery, and the lamp control unit may be configured to perform the lamp control according to the priorities when the remaining charge becomes lower than a predetermined threshold.

8 Claims, 7 Drawing Sheets

| | TYPE | CATEGORY |
|---|---|---|
| VEHICLE INFORMATION | D1 REMAINING BATTERY CHARGE | REMAINING CHARGE > THRESHOLD n? |
| | D2 TRAVELING ROAD | HIGHWAY, ORDINARY ROAD, SUBURBS, URBAN AREA, MOUNTAIN |
| | D3 ROAD CONDITION | STRAIGHT ROAD, CURVED ROAD, CROSSROADS |
| | D4 SURROUNDING VEHICLE | PRECEDING VEHICLE, ONCOMING VEHICLE, FOLLOWING VEHICLE, LIGHT VEHICLE, PEDESTRIAN |
| | D5 VEHICLE SPEED | STOP, LOW, MEDIUM, HIGH |
| | D6 AMBIENT LIGHT | BRIGHT (DAYTIME), DARK (NIGHTTIME) |
| | D7 WEATHER CONDITION | FAIR, RAINY, SNOWY, FOGGY |

FIG. 4

| TYPE OF LAMP | | LIGHT DISTRIBUTION | CONTROL MODE |
|---|---|---|---|
| CONTROL | HEADLAMP HL | LOW-BEAM LAMP LoL | ORDINARY, DIM, LIGHT-OFF |
| | | HIGH-BEAM LAMP HiL<br>* FULL DISTRIBUTION<br>* PARTIAL DISTRIBUTION | ORDINARY, DIM, LIGHT-OFF<br>ORDINARY, DIM, LIGHT-OFF |
| | | SWIVEL ACTUATOR SA | ORDINARY CONTROL, STOP |
| | | LEVELING ACTUATOR LA | ORDINARY CONTROL, STOP |
| | CLEARANCE LAMP CL | | ORDINARY, DIM |
| | TURN SIGNAL LAMP TSL | | ORDINARY, DIM, BLINK |
| | TAIL LAMP TL | | ORDINARY, DIM |
| | BACKUP LAMP BUL | | ORDINARY, DIM |
| | STOP LAMP SL | | ORDINARY, DIM, LIGHT-OFF |

| VEHICLE INFORMATION | | | | | LAMP | | |
|---|---|---|---|---|---|---|---|
| REMAINING BATTERY CHARGE | FORWARD VEHICLE (D4) | ROAD CURVATURE (D3) | AMBIENT LIGHT (D6) | Hi, Lo LAMPS | SWIVEL CONTROL | Lo LAMP |
| 50% (V1) | NOT PRESENT | ≥ R1 | < L1 | Hi BEAM | SWIVEL | ORDINARY |
| | | | ≥ L1 | Lo BEAM | | DIM |
| | PRESENT | < R1 | < L1 | Hi BEAM | SWIVEL | ORDINARY |
| | | | ≥ L1 | Lo BEAM | | DIM |
| 20~50% (V2) | | ≥ R1 | < L1 | PARTIALLY Lo BEAM | FIXED TO FRONT | ORDINARY |
| | | | ≥ L1 | Lo BEAM | | DIM |
| | | < R1 | < L1 | PARTIALLY Hi BEAM | SWIVEL | ORDINARY |
| | | | ≥ L1 | Lo BEAM | | DIM |
| | | ≥ R1 | < L1 | Lo BEAM | FIXED TO FRONT | ORDINARY |
| | | | ≥ L1 | Lo BEAM | | DIM |
| | | < R1 | < L1 | Lo BEAM | SWIVEL | ORDINARY |
| | | | ≥ L1 | Lo BEAM | | DIM |
| 5~20% (V3) | | | < L1 | Lo BEAM | FIXED TO FRONT | ORDINARY |
| | | | ≥ L1 | Lo BEAM | | DIM |
| ~5% (V4) | | | | Lo BEAM | FIXED TO FRONT | DIM |

US 8,866,388 B2

VEHICLE LAMP CONTROLLER

INCORPORATION BY REFERENCE

The disclosure of Japanese Patent Application No. 2011-142401 filed on Jun. 28, 2011 including the specification, drawings and abstract is incorporated herein by reference in its entirety.

BACKGROUND OF THE INVENTION

1. Field of the Invention

The present invention relates to a lamp controller for controlling what is called a lighting state of a lamp provided on a vehicle such as an automobile, the lighting state specifically meaning whether the lamp is lit on or lit off and how the light is distributed, and in particular relates to a lamp controller that is preferably applicable to lamps of an automobile that runs on electric power from a battery (electric cell).

2. Description of Related Art

In a vehicle such as an electric automobile or hybrid automobile, in which at least part of the electric power supplied from an on-vehicle battery is used to drive the vehicle, this battery is also utilized as power supply to light various lamps including headlamps and tail lamps. It is desirable for such a vehicle to suppress the power consumed by these lamps in order to ensure traveling of the vehicle or to improve the mileage even when the remaining charge of the battery becomes low. Some techniques have been proposed to control the lighting state of lamps in a vehicle that runs on electric power supplied from a battery in order to suppress the power consumed by the lamps when the remaining charge of the battery becomes low. Japanese Patent Application Publication No. 2006-188122 (JP 2006-188122 A) proposes a technique wherein the supply of power to lamps is automatically controlled or automatically stopped by detecting a remaining charge of the battery and the ambient light of the outside of the vehicle so that safety is ensured for the vehicle by illumination with the lamps while saving the power consumption of the lamps.

While the technique of JP 2006-188122 A is described in terms of application to headlamps of an automobile, this technique is actually a technique to automatically control or automatically turn off a plurality of lamps collectively. Therefore, when the technique of JP 2006-188122 A is applied to headlamps each including a low-beam lamp and a high-beam lamp, for example, light amounts of the high-beam lamps and low-beam lamps are reduced simultaneously once the remaining charge of the battery becomes low. On the other hand, when the technique of JP 2006-188122 A is applied to both headlamps and tail lamps, light amounts of both of the headlamps and tail lamps are reduced at the same time, or all of the headlamps and tail lamps are turned off. If the light amounts of all the lamps are simultaneously reduced, or all the lamps are turned off, it may become difficult to secure safety of the automobile by illumination of the lamps.

SUMMARY OF THE INVENTION

The present invention provides a vehicle lamp controller that makes it possible to suppress reduction of the battery charge and at the same time ensure minimum illumination required for ensuring safety for the vehicle.

An aspect of the present invention is a vehicle lamp controller that includes a lamp control unit configured to perform lamp control, in which light amount or light distribution of each of a plurality of lamps to be provided on a vehicle that runs on electric power from a battery, is controlled, according to a priority that is assigned to each of the plurality of lamps, wherein the priorities are determined based on degrees of necessity of the plurality of lamps in securing safety for the vehicle.

According to the present invention, the lamps are controlled according to a preset sequence or priorities that are determined in terms of degrees of necessity of the lamps in securing safety for the vehicle, whereby it is made possible to reduce the power consumption of the lamps. This makes it possible to reduce the power consumption of the lamps as a whole while ensuring the lighting state of those lamps that are ranked higher in the priority, in other words, those lamps that are required more for ensuring safety for the vehicle, and to enable the vehicle to be driven by its traction motor while suppressing reduction of the remaining battery charge.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
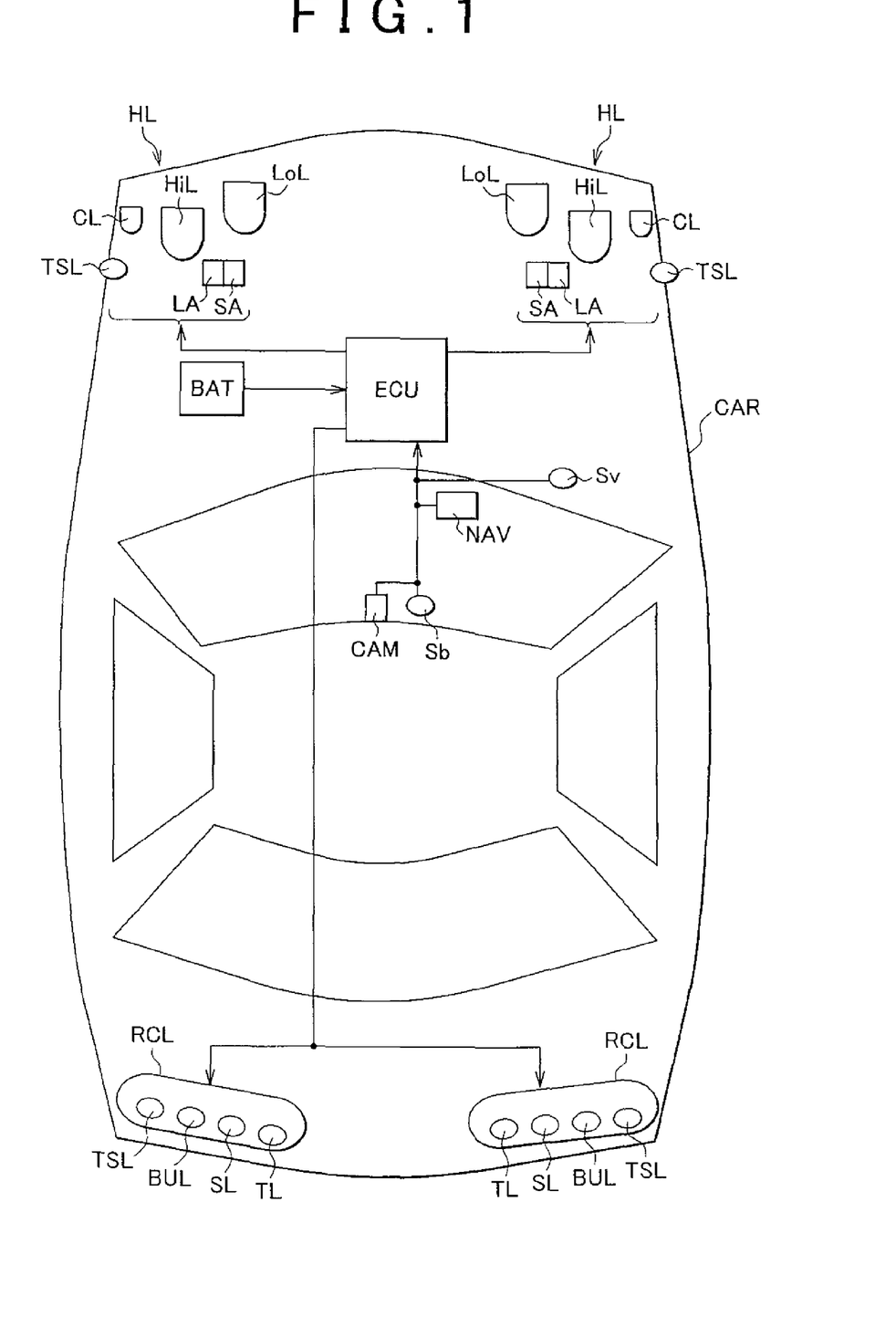
FIG. 1 is a schematic configuration diagram of an automobile in which the present invention is used.
Figure 2:
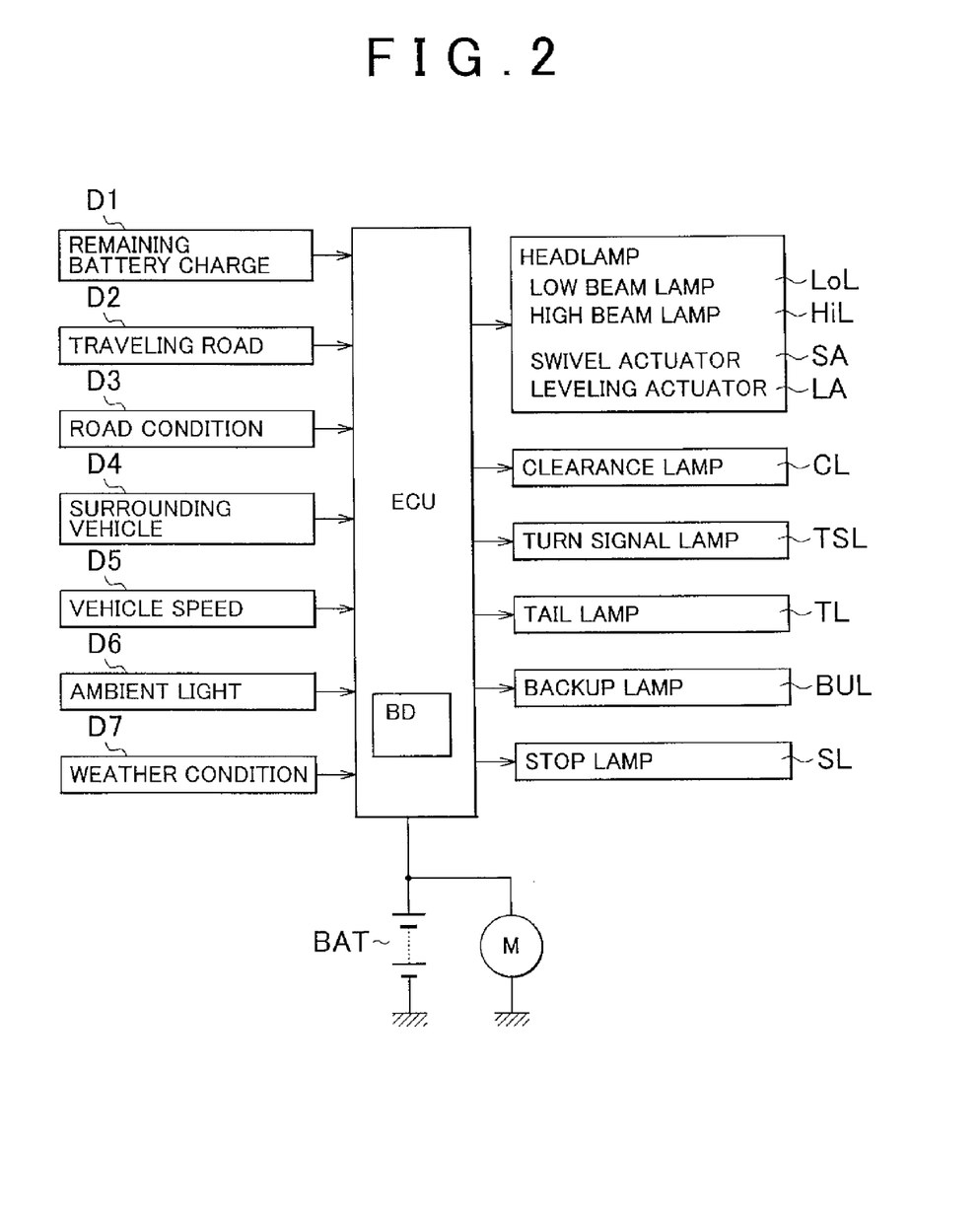
FIG. 2 is a block diagram of a lamp controller.

Embodiments of the present invention will be described with reference to the drawings. FIG. 1 is a schematic configuration diagram showing an embodiment of an electric automobile CAR in which the present invention is used. FIG. 2 is a block diagram of a lamp controller. The electric automobile CAR has a traction motor M (shown only in FIG. 2) that is driven for rotation by electric power from an on-vehicle battery BAT, and this traction motor M enables the electric automobile CAR to run by its own power. Left- and right-side headlamps HL are provided on the left and right sides of the front of the automobile CAR. Each of the headlamps HL includes a low-beam lamp LoL for radiating light with low-beam distribution, a high-beam lamp HiL for radiating light with high-beam distribution, a swivel actuator SA for controlling deflection of the low-beam lamp LoL in a horizontal lateral direction, and a leveling actuator LA for controlling change of the optical axis of the headlamp HL in a vertical direction. Further, in this embodiment, lamps as described below are provided as auxiliary lamps. A clearance lamp CL is provided integrally with each of the left and right side headlamps HL. A front turn signal lamps TSL is arranged close to each of the headlamps HL. Further, rear combination lamps RCL are provided on the left and right sides at the rear of the automobile. Each of the rear combination lamps RCL is an integral combination of a tail lamp TL, a stop lamp SL, a back-up lamp BUL, and a rear turn signal lamp TSL.

As shown in FIG. 2, the headlamps HL and the auxiliary lamps CL, TSL, TL, BUL, SL are connected to a lamp control unit ECU. This lamp control unit ECU controls the turning on and off and light amounts of the lamps HL, CL, TSL, TL, BUL, SL, while the swivel actuators SA and leveling actuators LA in the headlamps HL control the optical axes of the lamps. Thus, what is called the lighting state is controlled. The battery BAT is connected to the lamp control unit ECU, in which a remaining battery charge detecting device BD for detecting a remaining charge of the battery BAT is provided.

As shown in FIG. 1, the automobile CAR is provided with an imaging camera CAM for capturing an image of a region ahead of the automobile, a navigation device NAV for displaying map information of an area around the automobile, a speed sensor Sv for detecting a speed of the automobile, and a light sensor Sb for detecting ambient light around the automobile, all of which are connected to the lamp control unit ECU. The lamp control unit ECU detects a remaining charge D1 of the battery BAT through the remaining battery charge detecting device BD, and detects vehicle information based on an image captured by the imaging camera CAM, a vehicle speed detected by the speed sensor Sv, and ambient light detected by the light sensor Sb. Information detected as the vehicle information includes "traveling road D2" and "road condition D3" ahead of the host vehicle, and "surrounding vehicle D4" present ahead of the host vehicle, which are detected based on an image captured by the imaging camera CAM and map information of the navigation device NAV. The information detected as another piece of vehicle information is "vehicle speed D5" detected by the speed sensor Sv. The information that can be detected as other pieces of vehicle information are "ambient light D6" detected by the light sensor Sb and "weather condition D7" based on an image captured by the imaging camera CAM and an output of the light sensor Sb.

Figure 3:
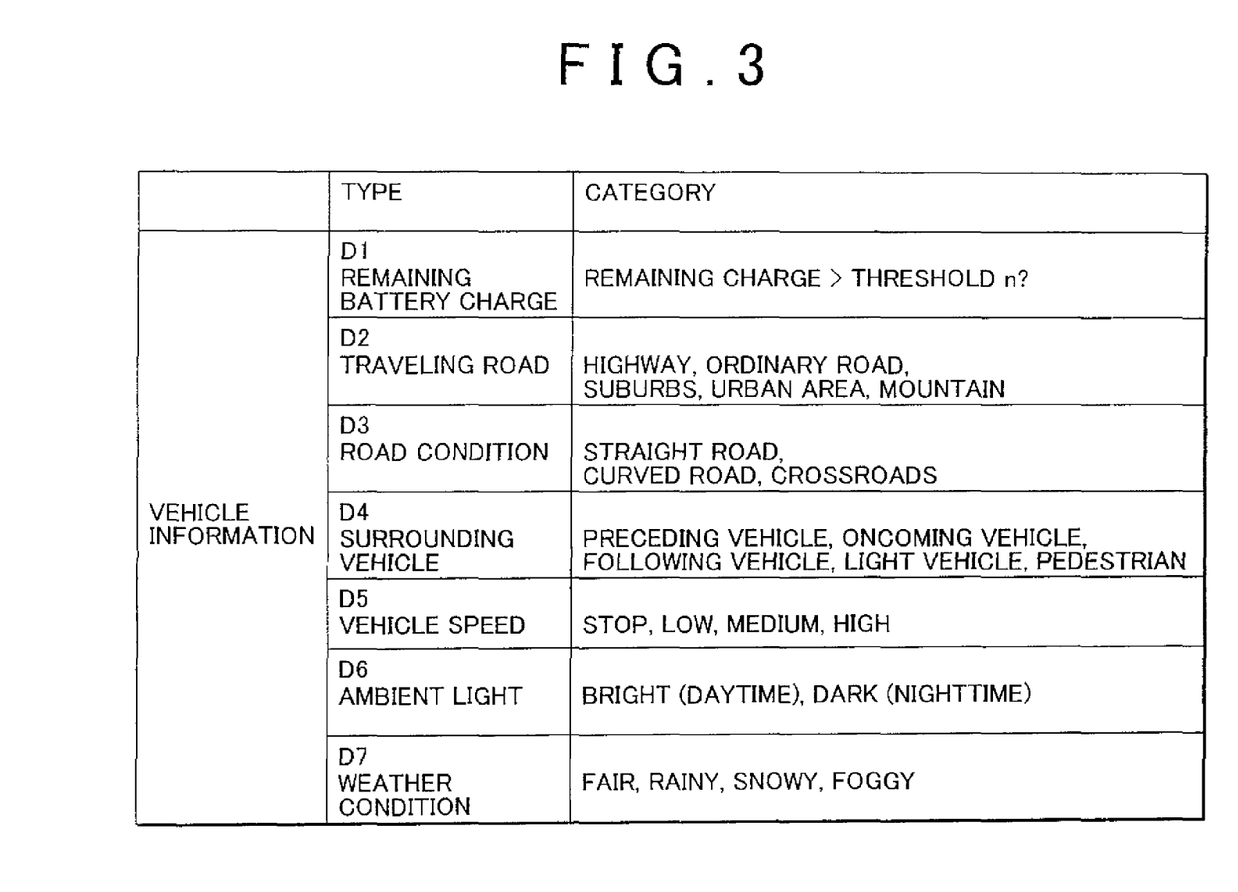
FIG. 3 is a table showing vehicle information.

FIG. 3 shows an example of the vehicle information described above. As the information of "remaining battery charge D1", the lamp control unit ECU compares the detected value with a threshold as described later to determine a remaining battery charge. As the information of "traveling road D2", the lamp control unit ECU determines which one the traveling road is, among a highway, an ordinary road, a suburbs road, an urban street, and a mountain road. As the information of "road condition D3", the lamp control unit ECU determines which one the road on which the vehicle is traveling is, among a straight road, a curved road, and crossroads, and when it is a curved road, determines its curvature. As the information of "surrounding vehicle D4", the lamp control unit ECU detects any of a preceding vehicle, an oncoming vehicle, and a following vehicle, and it may also detect a light vehicle and a pedestrian. As the information of "vehicle speed D5", the lamp control unit ECU determines whether the host vehicle is at a stop or traveling. When traveling, the lamp control unit ECU determines at which speed the host vehicle is traveling, low speed, medium speed, or high speed. The lamp control unit ECU determines whether it is daytime or nighttime, based on the information of "ambient light D6", and may also determine as the information of "weather condition D7", which the weather is, fair, rainy, snowy, or foggy.

Figure 4:
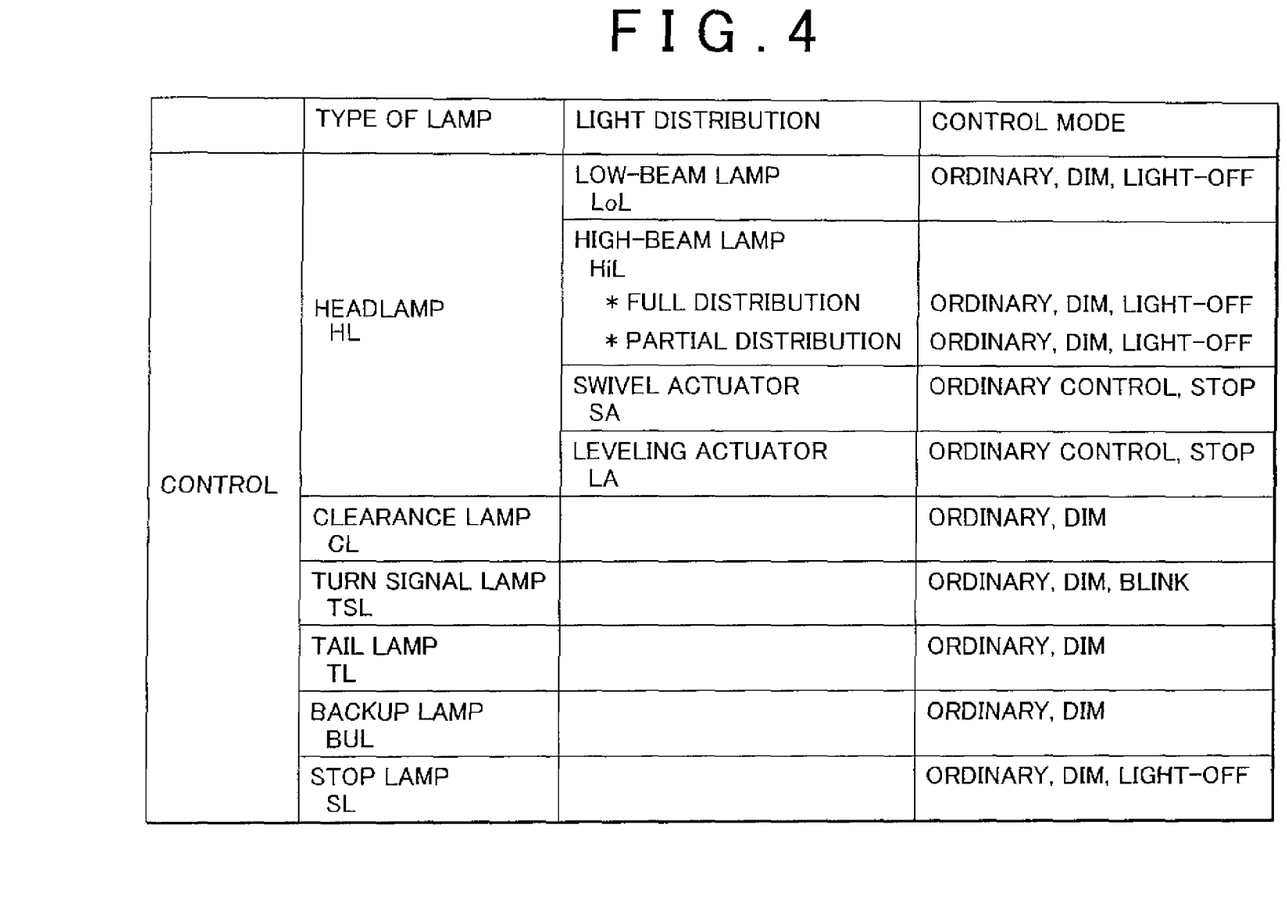
FIG. 4 is a table showing lighting control.

The control of the lighting state of the lamps HL, CL, TSL, TL, BUL, SL is as shown by way of example in FIG. 4. While description of some of the lamps will be omitted, the control of each of the headlamps HL is performed by controlling the low-beam lamp LoL, the high-beam lamp HiL, the swivel actuator SA, and the leveling actuator LA. The low-beam lamp LoL can be controlled among an ordinary light state in which the lamp is lit with an ordinary light amount, a dim light state in which the lamp is lit with a reduced light amount, and a light-off state. The high-beam lamp HiL can be controlled between a full light distribution state in which substantially the entire region ahead of the host vehicle is illuminated and a partial light distribution state in which a region other than the region where a preceding vehicle or oncoming vehicle is present is illuminated (e.g. adaptive driving beam (ADB)). Moreover, either in the full distribution state or the partial distribution state, the high-beam lamp HiL can be controlled among an ordinary light state in which the lamp is lit with an ordinary light amount, a dim light state in which the lamp is lit with a reduced light amount, and a light-off state. The swivel actuator SA can be controlled between a state enabling an ordinary swivel control and a stop state in which the lamp optical axis is fixed toward the lane on which the host vehicle is traveling. The leveling actuator LA can be controlled between a state enabling an ordinary leveling control and a stop state in which the lamp optical axis is fixed downward.

The auxiliary lamps, namely the clearance lamps CL, the turn signal lamps TSL, the tail lamps TL, the back-up lamps BUL, and the stop lamps SL are also controlled as shown in FIG. 4. Although detailed description of the individual lamps is omitted here, each of them can be controlled among an ordinary light state in which the lamp is lit with an ordinary light amount and a dim light state in which the lamp is lit with a reduced light amount. Further, some of the lamps can be controlled to a blink state in which the lamp is lit on and off in a predetermined cycle.

In the lamp control unit ECU connected to the imaging camera CAM, the navigation device NAV and various sensors Sv, Sb, a priority order of controlling the lighting states for the lamps HL, CL, TSL, TL, BUL, SL is set in advance. This priority order is generally determined in consideration of a difference in the power consumed when the lamp is lit and when the lamp is controlled, and a type of the lamp required to be lit in order to ensure safety of the automobile. For example, a lamp whose importance is low in terms of safe traveling of the automobile is ranked high in the priority order, while a lamp whose importance is high is ranked low in the priority order. This priority order is not set fixedly and the controller is configured so that a driver of the automobile can change it as required. The lamp control unit ECU compares the remaining charge of the battery BAT detected by the remaining battery charge detecting device BD with one or more preset thresholds (threshold charge amount(s)), determines a remaining charge of the battery BAT based on the result of this comparison, and performs control of the lamps according to the priority order set based on this determination.

(First Embodiment)

Figure 5:
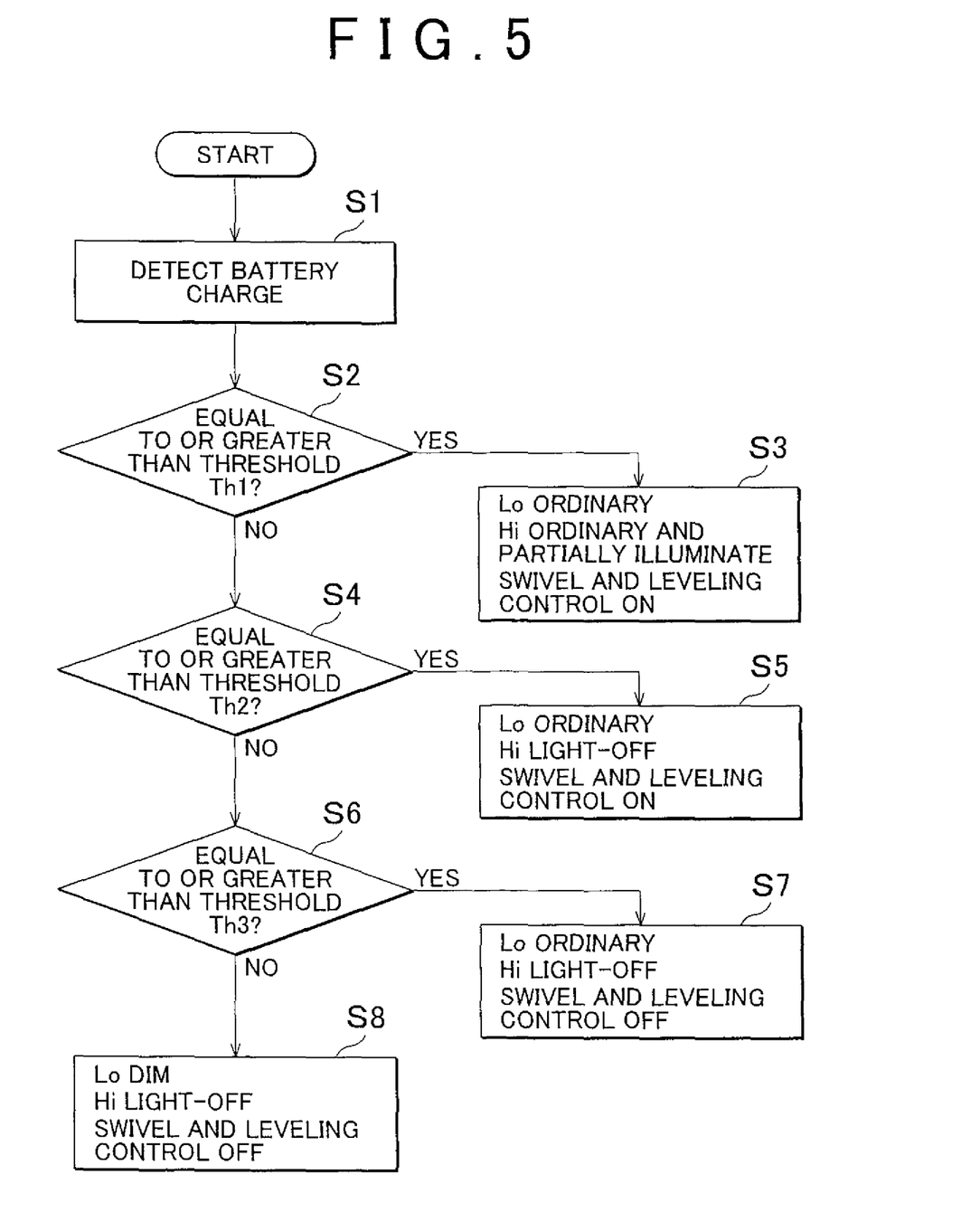
FIG. 5 is a control flowchart according to a first embodiment.

FIG. 5 is a flowchart of a first embodiment. According to this first embodiment, the present invention is applied only to the headlamps Hl that consume a lot of electric power and have a greater effect on traveling of the vehicle with use of the traction motor M. The lamp control unit ECU detects a remaining charge of the battery BAT (hereafter, also referred to merely as "remaining charge") by means of the remaining battery charge detecting device BD (S1), and compares the detected remaining charge with a first threshold Th1, a second threshold Th2, and a third threshold Th3 sequentially in this order (S2), where Th1>Th2>Th3. When the remaining charge is equal to or greater than the first threshold Th1 in step S2, the headlamp HL is controlled to the ordinary light state (S3). Specifically, the low-beam lamp LoL is lit normally, the high-beam lamp HiL is also lit or partially lit if required, and the swivel control and the leveling control are also executed if required. When the remaining charge is smaller than the first threshold Th1, the remaining charge is compared with the second threshold Th2 (S4). When the remaining charge is equal to or greater than the second threshold Th2, the low-beam lamp LoL is normally lit, whereas the high-beam lamp HiL is controlled to the dim light state or is turned off. In this case, the swivel control and the leveling control are enabled (S5). When the remaining charge is smaller than the second threshold Th2, the remaining charge is compared with the third threshold Th3 (S6). When the remaining charge is equal to or greater than the third threshold Th3, the low-beam lamp LoL is normally lit, whereas the high-beam lamp HiL is turned off. The swivel control and the leveling control are stopped and the optical axis of the lamp is fixed to a leftward and downward direction, for example (S7). When the remaining charge is smaller than the third threshold Th3, the low-beam lamp LoL is controlled to the dim light state in addition to the control of step S7 (S8).

Thus, when the remaining charge is equal to or greater than the first threshold Th1, the headlamp HL is controlled to the ordinary light state, whereas as the remaining charge gradually decreases, the control of the lamp ranked lower in the priority order is performed in the following order: the control of lighting of the high-beam lamp HiL having high power consumption with high-beam distribution; the swivel control and the leveling control to be executed by the swivel actuator SA and the leveling actuator LA, respectively; and the control of the light amount of the low-beam lamp LoL. In this manner, it is made possible to suppress the reduction of the charge of the battery BAT due to lighting of the lamps or driving of the actuators, whereby it is ensured that the automobile can run on electric power from the battery BAT using the traction motor M and a minimum necessary illumination with the headlamps HL for safety traveling of the automobile is secured.

(Second Embodiment)

Figure 6:
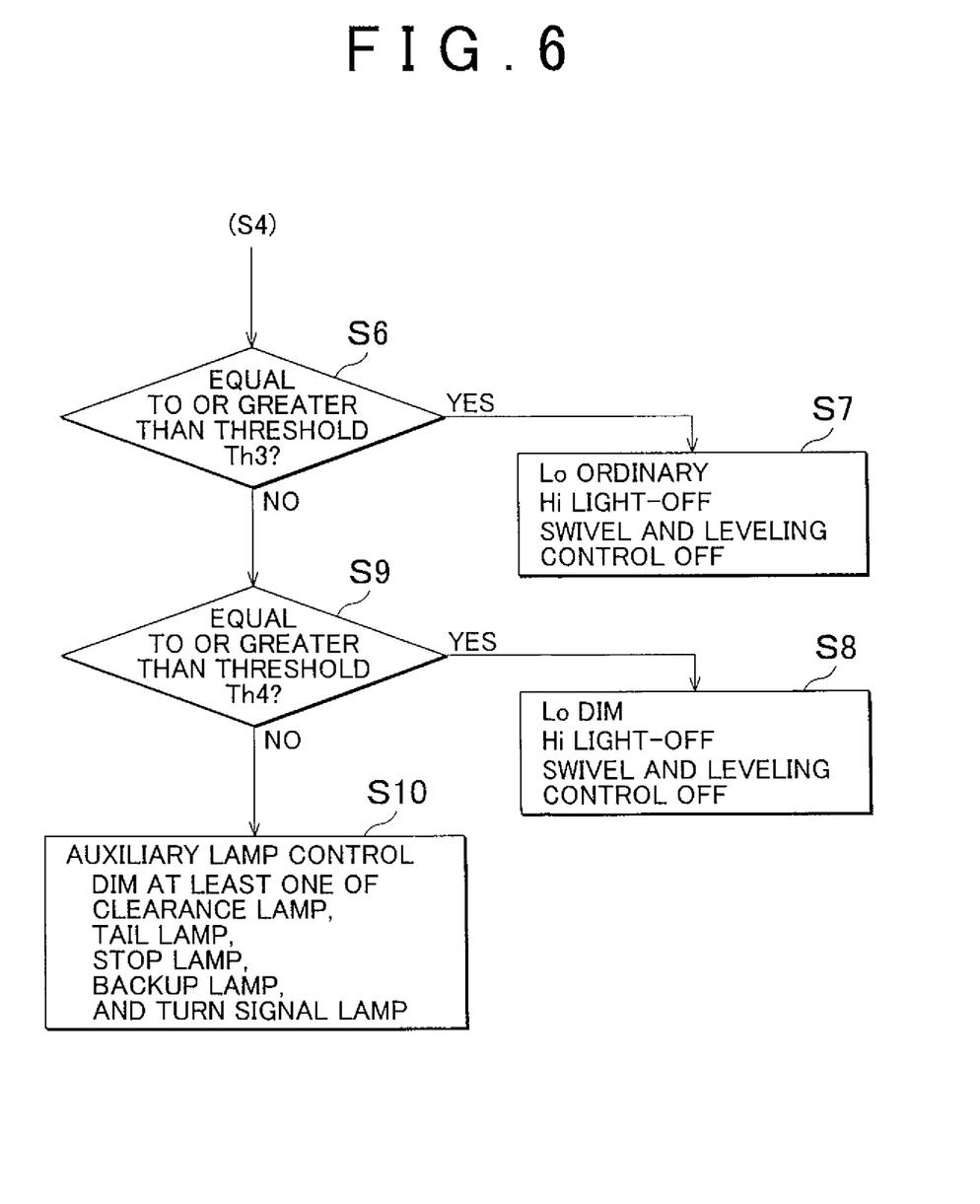
FIG. 6 is a control flowchart according to a second embodiment.

This second embodiment is different from the first embodiment in that the auxiliary lamps are additionally controlled. As shown in the flowchart of FIG. 6, step S9 of comparing the remaining charge with a fourth threshold Th4 that is lower than the third threshold Th3 is added after step S6 of comparing the remaining battery charge with the third threshold Th3. When the remaining charge is equal to or greater than the fourth threshold Th4, step S8 described above is executed, but when the remaining charge is smaller than the fourth threshold Th4, the auxiliary lamps are controlled (S10). While various methods are applicable to the control of the auxiliary lamps, a method in which the light amounts of the clearance lamps CL, and any one or a plurality of or all of the tail lamps TL, the back-up lamps BUL, the turn signal lamps TSL, and the stop lamps SL constituting the rear combination lamps RCL are reduced, is employed in this embodiment.

When the light amounts of the lamps CL, TL, BUL, TSL, SL as the auxiliary lamps are to be reduced, it is possible to reduce the light amounts of predetermined lamps. Alternatively, these auxiliary lamps also may be ranked in the priority order in advance so that as the remaining charge of the battery BAT is reduced, the lamps are dimmed sequentially in the priority order. In the second embodiment, like in the first embodiment, the lighting of the headlamps HL is controlled to suppress reduction of the battery charge. When the remaining battery charge is nevertheless further reduced, the lighting of the auxiliary lamps is also controlled to suppress further reduction of the battery charge, whereby it is made possible to ensure traveling of the host vehicle and to ensure illumination of the auxiliary lamps required to ensure visibility of the host vehicle to other vehicles.

(Third Embodiment)

A third embodiment is intended to control the headlamps HL in consideration of the vehicle information indicating traveling conditions of the vehicle in addition to determination of the remaining charge of the battery. The vehicle information used here includes an image captured by the imaging camera CAM, information on "surrounding vehicle D4" detected from map information provided by the navigation device NAV, in particular, information on whether or not there is a forward vehicle, information on a curvature of a curved road of "road condition D3", information of "ambient light D6" around the host vehicle, and information of "vehicle speed D5" of the host vehicle. The lamp control is executed with respect to the lighting states of the high-beam lamps HiL and low-beam lamps LoL and the swivel control by the swivel actuator SA. A priority order is determined for the combination of these control items of the lamp control. Specifically, referring to the table in FIG. 7, as in the case of the first embodiment, the lamp control unit ECU compares a remaining battery charge with the first to third thresholds Th1 to Th3 to determine which one of V1 to V4 the remaining charge is in, and at the same time makes determination about the vehicle information. In this determination on the vehicle information, it is determined whether or not there is a forward vehicle, whether the value indicating a road curvature (a curvature radius Rx in this embodiment) is equal to or greater than a predetermined threshold R1, and whether the ambient light around the host vehicle is equal to or higher than a predetermined threshold L1. The headlamps HL are then controlled based on the remaining battery charge and the results of determination concerning the vehicle information.

Figure 7:
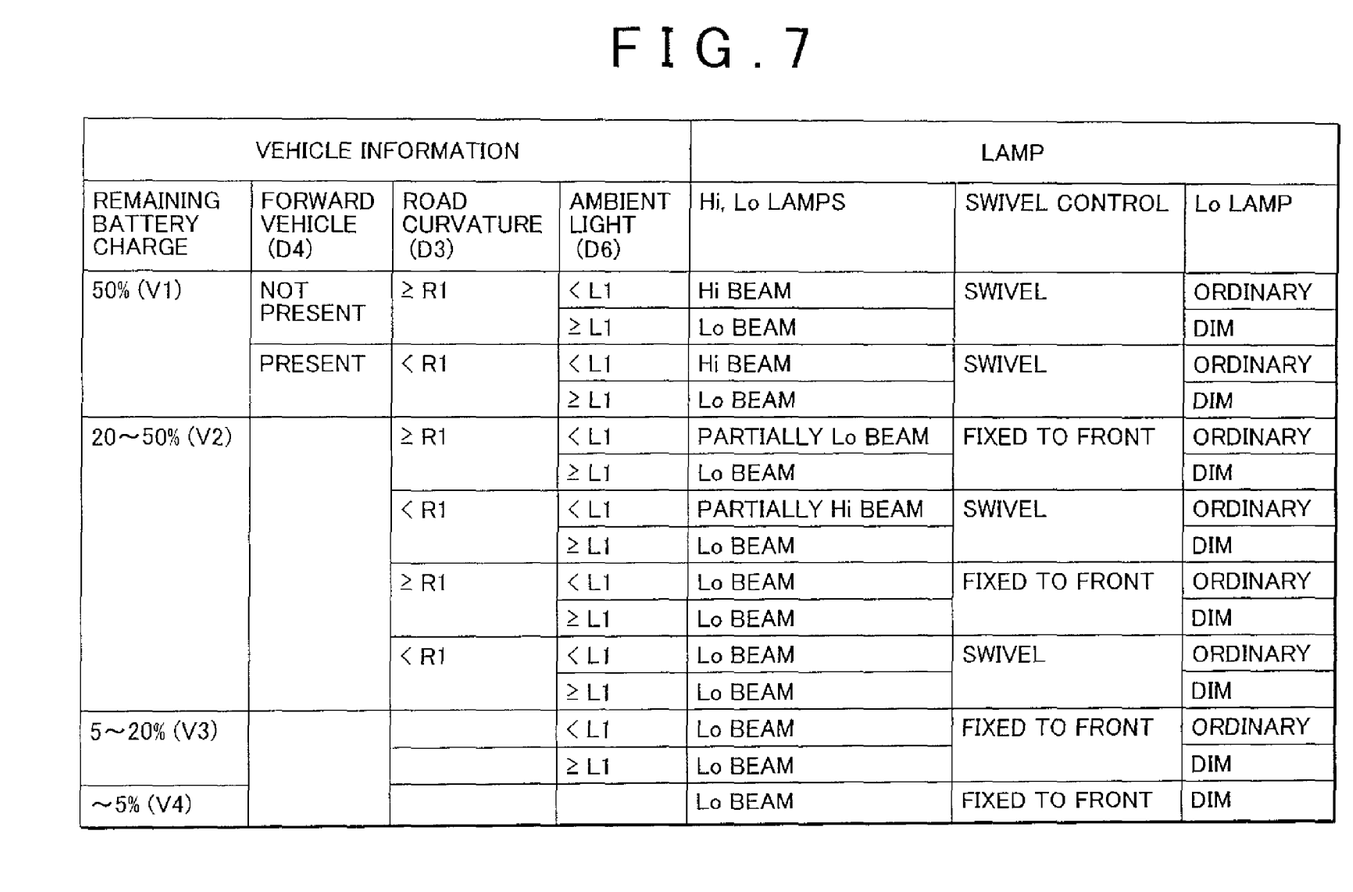
FIG. 7 is a control table according to a third embodiment.

Although in this third embodiment, the control is executed to light either the both of the high-beam lamp HiL and low-beam lamp LoL of the headlamp HL or only the low-beam lamp LoL, the high-beam lamp HiL can be controlled with respect to whether or not partial high-beam distribution is employed to illuminate on a region where no forward vehicle is present. Further, the controller is configured so that it is possible to perform control with respect to whether the swivel control is executed or stopped to fix the optical axes toward the front, and with respect to whether the low-beam lamp LoL is lit in an ordinary mode or dim mode.

When a remaining charge of the battery BAT is determined in the same manner as in the first embodiment, and the remaining charge is determined to be a charge range V1 that is equal to or greater than the first threshold Th1, the lamp control is performed according to whether or not a forward vehicle is present, whether or not a road curvature radius is equal to or greater than the threshold R1, and whether or not the ambient light around the host vehicle is equal to or greater than the threshold L1. For example, when there is no forward vehicle, the curvature radius is equal to or greater than the threshold R1, and the ambient light is lower than the threshold L1, the high-beam lamps HiL are lit and the low-beam lamps are lit in an ordinary mode, while the swivel control is enabled. When the ambient light is equal to or higher than the threshold L1, the high-beam lamps HiL are turned off and the low-beam lamps LoL are lit in a dim mode.

When there is a forward vehicle, the curvature radius is equal to or greater than the threshold R1, and the ambient light is lower than the threshold L1, the high-beam lamps HiL are partially lit to prevent the driver of the forward vehicle from being blinded. In addition, the low-beam lamps LoL are lit in the ordinary mode and the swivel control is stopped to fix the optical axes of the lamps toward the front of the vehicle. When the ambient light becomes equal to or higher than the threshold L1, the high-beam lamps HiL are turned off, while the low-beam lamps LoL are lit in the dim mode.

When the remaining charge is in a charge range V2, that is, the remaining charge is smaller than the first threshold Th1 and equal to or greater than the second threshold Th2, the lamp control is performed, regardless of whether or not there is a forward vehicle, according to the results of determination as to whether or not the road curvature radius is greater or smaller than the threshold R1, and determination as to whether the ambient light around the host vehicle is higher or lower than the threshold L1. In this embodiment, the high-beam lamps HiL of the headlamps HL are not lit, and control is performed to determine whether the swivel control is executed or stopped to fix the optical axes of the lamps toward the front, and whether the low-beam lamps LoL are lit in the ordinary mode or in the dim mode.

When the remaining charge is in a charge range V3, that is, the remaining charge is smaller than the second threshold Th2 and is equal to or greater than the third threshold Th3, the lamp control is performed, regardless of whether or not there is a forward vehicle or a difference in magnitude of the road curvature radius, according to the result of determination as to whether the ambient light around the host vehicle is higher or lower than the threshold L1. In this case, the high-beam lamps HiL are not lit, and the swivel control is stopped to fix the optical axes toward the front, regardless of whether the automobile is traveling or at a stop, and control is performed so that the low-beam lamps LoL are lit in the ordinary mode or in the dim mode.

When the remaining charge is in a charge range V4, that is, the remaining charge is smaller than the third threshold Th3, the high-beam lamps HiL are not lit unconditionally, the swivel control is stopped to fix the optical axes of the lamps toward the front, and the control performed is to dim the low-beam lamps LoL only.

Thus, according to the third embodiment, the lamp control is executed in the preset sequence based not only on the remaining battery charge but also on the vehicle information, whereby it is made possible to suppress reduction of the remaining battery charge to ensure traveling of the host vehicle, and it is also made possible to secure illumination by the headlamps required to ensure safe traveling of the host vehicle. Although in this example, the first to third thresholds Th1 to Th3 are set for determining the remaining battery charge while the remaining charge is classified into multiple ranges, namely the remaining capacities of 50%, 20%, and 5%, the present invention is not limited to these specific values. Further, the number of ranges to determine the remaining charge is not limited particularly but may be set to a selected number. Likewise, the determination on the vehicle information also can be performed while classifying the vehicle information into an arbitrary number of categories.

In the present invention, the lamps to be controlled by the lamp control and the priority order in the lamp control are not static or fixed, and the lamps and the priority order may be changed, for example, based on part of the detected vehicle information. For example, when a lamp control unit detects a vehicle speed of the host vehicle when the vehicle is traveling, the present invention is used in the lamp control of the headlamps, that is, the priority order is determined, in order to secure illumination of a region ahead of the host vehicle in view of the safety in traveling of the host vehicle. Meanwhile, when the vehicle is at a stop, the present invention may be used in the control of the rear combination lamps, that is, the priority order may be determined, in order to ensure visibility of the host vehicle to following vehicles.

Although the foregoing embodiments are described in terms of an example in which the remaining battery charge detecting device is incorporated in the lamp control unit, the remaining battery charge detecting device may be provided independently from the lamp control unit.

The lamps to be controlled in the present invention are not limited to those described in the foregoing embodiments. The lamp control is not limited to the control of the turning on and off of the lamps but may be control of the distribution of light. Further, it should be understood that the vehicle information used in the present invention is not limited to the vehicle information described in the foregoing embodiments.

The present invention is applicable to lamp controllers for use in vehicles running on electric power from batteries.

The present invention has been described with reference to example embodiments for illustrative purposes only. It should be understood that the description is not intended to be exhaustive or to limit form of the present invention and that the present invention may be adapted for use in other systems and applications. The scope of the present invention embraces various modifications and equivalent arrangements that may be conceived by one skilled in the art.

According to the present invention, the lamp control unit may be configured to determine a priority order based on vehicle information representing a traveling status of the vehicle. The remaining battery charge detecting device may be configured to change the priority order in accordance with a remaining battery charge. A plurality of ranges of the remaining charge of the battery may be set in advance in the lamp control unit, and the lamp control unit may be configured to determine the priorities depending on which one of the plurality of ranges the remaining charge is in. The plurality of lamps may include headlamps and auxiliary lamps, and the lamp control unit may be configured to perform lamp control at least on the headlamps.

What is claimed is:

1. A vehicle lamp controller comprising
a lamp control unit configured to perform lamp control, in which light amount or light distribution of each of a plurality of lamps to be provided on a vehicle that runs on electric power from a battery is controlled, according to a priority that is assigned to each of the plurality of lamps, wherein the priorities are determined based on degrees of necessity of the plurality of lamps in securing safety for the vehicle; and
a remaining battery charge detecting device configured to detect a remaining charge of the battery,
wherein
the lamp control unit is configured to perform the lamp control according to the priorities when the remaining charge becomes lower than a predetermined threshold;
the plurality of lamps include a first lamp and a second lamp that is higher in the priority than the first lamp,
the lamp control unit is configured to, when the remaining charge becomes lower than the predetermined threshold, reduce power that is consumed by the first lamp and maintain power that is consumed by the second lamp,
the plurality of lamps include a headlamp having a high-beam lamp and a low-beam lamp, and
the first lamp and the second lamp are the high-beam lamp and the low-beam lamp, respectively.

2. The vehicle lamp controller according to claim 1, wherein
a plurality of the predetermined thresholds are set in advance, and
the lamp control unit is configured to reduce power that is consumed by at least one of the plurality of lamps according to the priorities, every time the remaining charge becomes lower than one of the plurality of predetermined thresholds.

3. The vehicle lamp controller according to claim 1, wherein
the lamp control unit is configured to determine the priorities based on vehicle information representing a traveling status of the vehicle.

4. The vehicle lamp controller according to claim 3, further comprising
an imaging device configured to capture an image of a region ahead of the vehicle, wherein
the vehicle information includes information regarding whether or not there is a vehicle around a host vehicle that is detected based on the image captured by the imaging device.

5. The vehicle lamp controller according to claim 3, further comprising
a navigation device configured to display map information of a region around a host vehicle, wherein
the vehicle information includes information relating to a traveling road ahead of the vehicle and information relating to a road condition that are obtained by the navigation device.

6. A vehicle lamp controller comprising
a lamp control unit configured to perform lamp control, in which light amount or light distribution of each of a plurality of lamps to be provided on a vehicle that runs on electric power from a battery is controlled, according to a priority that is assigned to each of the plurality of lamps, wherein the priorities are determined based on degrees of necessity of the plurality of lamps in securing safety for the vehicle, and
a remaining battery charge detecting device configured to detect a remaining charge of the battery,
wherein
the lamp control unit is configured to perform the lamp control according to the priorities when the remaining charge becomes lower than a predetermined threshold, and
the lamp control unit is configured to change the priorities in accordance with the remaining charge.

7. The vehicle lamp controller according to claim 6, wherein
a plurality of ranges of the remaining charge of the battery are set in advance in the lamp control unit, and
the lamp control unit is configured to determine the priorities depending on which one of the plurality of ranges the remaining charge is in.

8. A vehicle lamp controller comprising
a lamp control unit configured to perform lamp control, in which light amount or light distribution of each of a plurality of lamps to be provided on a vehicle that runs on electric power from a battery is controlled, according to a priority that is assigned to each of the plurality of lamps, wherein the priorities are determined based on degrees of necessity of the plurality of lamps in securing safety for the vehicle;
wherein
the plurality of lamps include a headlamp and an auxiliary lamp,
the lamp control unit performs the lamp control at least on the headlamp,
the headlamp includes a high-beam lamp and a low-beam lamp, and
the high-beam lamp is set lower in the priority than the low-beam lamp.

* * * * *